Jan. 3, 1928.
E. D. BROWN
1,655,131
AUTOMOBILE BRAKE
Filed Sept. 6, 1921
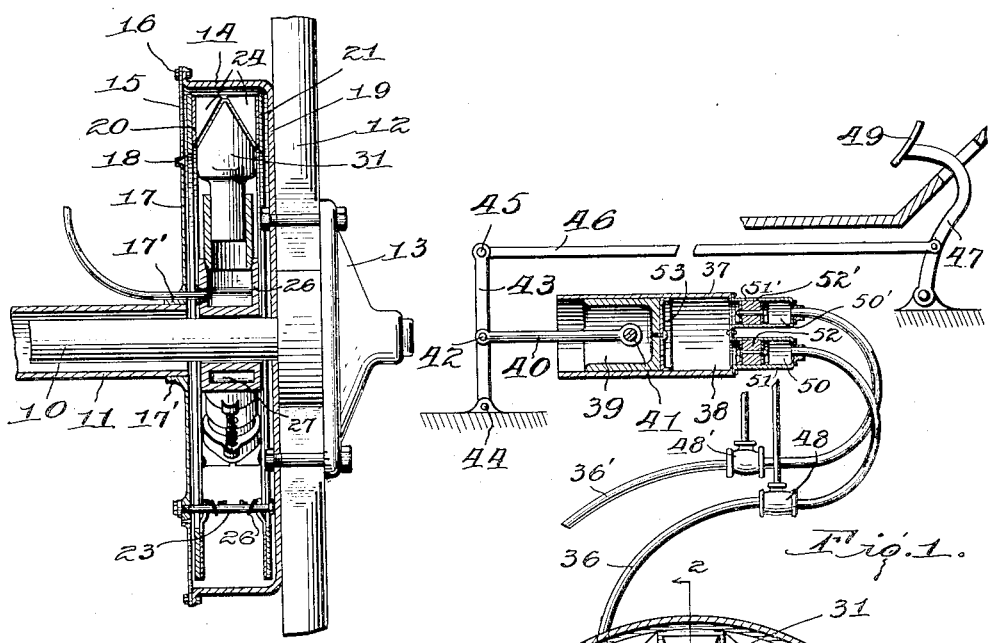
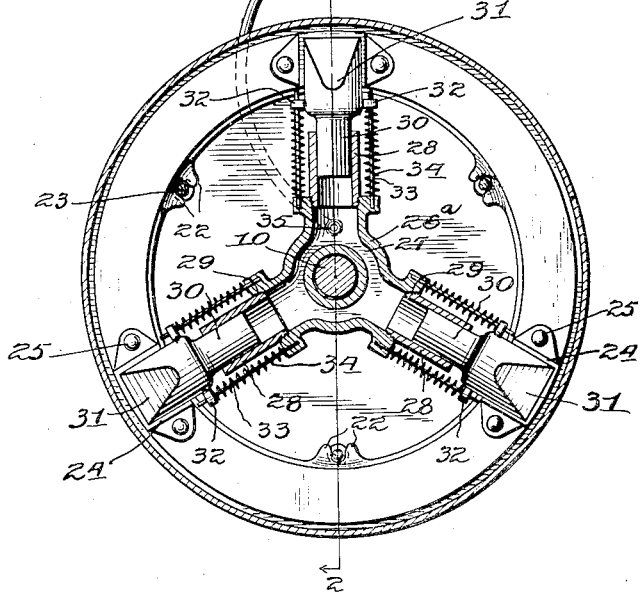
Inventor
Ernest D. Brown.
By Walter W. Burns
Attorney Patented Jan. 3, 1928.

1,655,131

UNITED STATES PATENT OFFICE.

ERNEST D. BROWN, OF MERIDIAN, MISSISSIPPI.

AUTOMOBILE BRAKE.

Application filed September 6, 1921. Serial No. 498,659.

This invention relates to vehicle brakes and particularly to those brakes operated by a fluid medium.

An object of my invention is the provision of an improved fluid operated brake having radially movable plungers which cause the brake to be set when the plungers are operated by the fluid medium.

Another object of my invention is the provision of an improved fluid operated brake having equidistant radially movable plungers which control the operation of co-operating wedge shaped members to cause frictional engagement between a part rigid with the wheel and a part rigid with the vehicle frame.

Another and further object of my invention is to eliminate uneven wear of brake bands and do away with brake adjustment.

Another and still further object of my invention is to make unnecessary the use of the usual brake rods and levers which so often become loose and cause rattling due to loose parts and wear at the bearings.

Another and still further object of my invention is the provision of a foot operated plunger having independent connections therefrom to the brakes on the right and left sides of the vehicle.

Other and further objects of my invention will be apparent from the detailed description and claims.

Referring to the drawings where a preferred embodiment of my invention is illustrated.

Fig. 1 is a diagrammatic sketch of the brake and its operating mechanism showing a piston in cross-section.

Fig. 2 is a cross-section taken on the line 2—2 of Fig. 1.

Similar reference characters refer to similar parts throughout the drawing.

10 designates the axle of an automobile or other vehicle upon which my invention is installed. 11 designates the rear axle housing, 12 the spokes of the wheel, 13 the hub thereof. Attached to the spokes is the revolving cup shaped member 14. This cup shaped member 14 is securely attached to and revolves with the wheel of the vehicle and with the annular disk 15 attached at its inner edge, provides surfaces for engagement with non-rotating brake disks, to be described. This engagement causes the braking action for the vehicle in a manner to be later described. The annular disk 15 is secured to the cup shaped member 14 by the bolts 16.

Within the annular disk 15 is a plate 17 having flanges 17' secured to and rigid with the rear axle housing 11. Between the outer periphery of the plate 17 and the inner periphery of the disk 15 is a space 18 to provide for clearance between these two members. Between the annular disk 15 and the inside of the outer wall 19 of the cup shaped member 14 are disks 20 and 21. The disk 20 is closely adjacent the disk 15 and is normally held out of contact therewith. The disk 21 is closely adjacent the inside of the outer wall 19 and is also normally held out of contact therewith by the springs 26 shown in the lower portion of Fig. 2. These springs are attached at one end to the bolts 23 and at their other ends to the disks 20 and 21 respectively. The disks 20 and 21 are constructed of suitable material and may carry any of the well known friction materials.

On the inner periphery of the disks 20 and 21 are a series of lugs 22 which engage bolts 23, which bolts are rigidly held in a solid portion of the plate 17.

Each of the disks, 20 and 21, is provided with wedge shaped members 24, each arranged opposite a corresponding wedge shaped member of the other disk. These wedge shaped members 24 are suitably secured to the respective disks, as by rivets 25.

A box 26ª, having a chamber 27, is arranged about and is attached rigidly to the rear axle housing. To this box 26ª are attached a plurality of cylinders 28, which are spaced radially with relation to the rear axle housing. These cylinders are suitably secured, as by threads 29, to the box 26ª.

Within the cylinders 28 and extending therefrom are pistons 30 which have at their outer ends the wedge shaped disk operating members 31. At the sides of the operating members 31 are lugs 32. These lugs 32 have holes through which guide rods 33 pass. These guide rods 33 are securely fastened in the box 26 and carry retracting springs 34 which are fastened at their ends to the casting 26ª and the lugs 32 respectively. The springs 34 are normally under tension and tend to hold the operating members 31 and the pistons 30 inwardly toward the center of the box 26ª.

Tapped into the box 26ª at 35 is a pipe 36 which leads from a cylinder 37 having a chamber 38. Within the cylinder 37 is a piston 39 which moves therein and is operated by the connecting rod 40 and the wrist pin 41. The outer end of the rod 40 is attached at 42 to a lever 43 which is fulcrumed at 44. The opposite end of the lever 43 is attached at 45 to a rod 46. This rod 46 is operated by a foot lever 47 which extends to a position convenient to the vehicle operator.

A pipe 36' similar to the pipe 36 is provided for the brake attached to another wheel.

A cut off valve 48, 48' is provided, in the pipes 36, 36' respectively to cut off the communication between the chamber 38 or corresponding chamber and the chamber 27. The operating handle or handles for these valves would be placed convenient for the operator, who would close the valves when he desired to leave the brakes set, as when stopping on a hill.

Between the chamber 38 and the respective pipes 36, 36', are cylinders 51—51' having intermediate chambers 50—50'. Within the cylinder chambers 50, 50' are pistons 52, 52' respectively. The piston 39 maintains a tight seal with the cylindrical chamber 38 by suitable means as the leather washer 53. At each end of the pistons 52, 52' are similar but smaller leather washers for causing a tight seal between the pistons 52, 52' and their respective cylinders.

In operation, the tread 49 of the foot lever 47 is pressed by the foot of the operator when he desires to check or stop the vehicle. This action pulls the link 46 to the right (in Fig. 1) and forces the piston 39 to the right. This movement of the piston 39 causes the fluid in the chamber 38 to be forced against the intermediate pistons 52, 52' which in turn forces the fluid through the pipes 36, 36' into the chamber 27 or corresponding chamber within the box 26ª. Pressure is thus exerted on all of the pistons 30 to cause them to press outwardly on the wedge shaped operating members 31. The wedging action of these latter members on the members 24 causes the disks 20 and 21 to be forced farther apart and against the disk 15 and wall 19 of the cup shaped member respectively. Since the cup shaped member 14 with its wall 19 and the disk 15 revolve with the wheel and since the disks 20 and 21 are prevented from moving by the bolts 23, it will be clear that the revolving of the wheel of which the spokes 12 and hub 13 form a part, will be checked or stopped depending upon the pressure exerted by the operating members 31 against the wedge members 24.

Should the operator desire to leave the brakes set, he would close the valves 48, 48' by a conveniently located handle (not shown). The foot lever could then be released without releasing the brakes. When it was desired to release the brakes, the foot lever 47 would be relieved of pressure by the foot or the valve 48 would be opened. The springs 34 exerting an inward pull on the wedge shaped operating members would pull in their respective operating members and the corresponding pistons. This would return the fluid through the pipe 36 to the chambers 50—50'.

Should any of the pipes 36, 36' become broken or leak, the operation of the other brakes would not be affected. Suppose, for example, the pipe 36 should break. The intermediate piston 52 would immediately be forced to the right (Figure 1) and effectively check the escape of the fluid from the brakes on the other system—permitting the brakes on the other wheels to operate without interruption.

It will thus be seen that I have devised an improved fluid operated brake which will be efficient in operation, unnecessary to adjust and due to the absence of the usual long brake rods, will be much quieter because of the fact that there are fewer parts to rattle.

It will also be seen that I have provided an improved fluid operated brake which may be applied to all four wheels of a vehicle if desired and which, when the brake on one wheel is disabled, will still be effective on the other wheels.

While I have described a preferred embodiment of my invention, I desire to have it understood that I do not limit myself to the exact construction shown and that modifications and changes can be made without departing from the spirit of my invention and within the scope of the appended claims.

Having described my invention what I claim is:

1. A vehicle brake comprising a vehicle wheel, frictional means carried by the wheel, a fluid chamber, a plurality of cylinders having communication with the chamber and radially placed about a common center, pistons in the cylinders, non-rotating friction means in position for engagement with the frictional means carried by the wheel, and wedge means operatively connecting the pistons and frictional means to bring the rotating frictional means and the non-rotating frictional means into contact with each other.

2. A vehicle brake comprising a rotatable member having frictional bearing surfaces, a pair of nonrotating members carrying a pair of frictional bearing surfaces in position to engage the frictional bearing surfaces of the rotatable member, a fluid chamber, a plurality of cylinders having communication with the fluid chamber and having their axes arranged radially from a common center, pistons in the cylinders and connections between the pistons and the members carrying the frictional bearing surfaces whereby axial movement of the pistons will cause relative movement between the rotatable member and the non-rotatable members to bring them into frictional engagement, and in a direction normal to the plane of the axes of the cylinders.

3. A vehicle brake comprising a rotatable member having a frictional bearing surface, a non-rotating member having a frictional bearing surface in position to engage the frictional bearing surface of the rotatable member, a fluid chamber, a plurality of cylinders having communication with the fluid chamber, pistons in the cylinders and wedging connections between the pistons and members having frictional bearing surfaces to bring the bearing surfaces into contact with each other.

4. A vehicle brake comprising a rotatable member having a pair of frictional bearing surfaces, a pair of non-rotating annular frictional members mounted for axial movement, oppositely disposed bearing surfaces on the non-rotatable frictional members, a wedge member mounted for movement radially with relation to the axis of the annular frictional members and in position to engage the bearing surfaces of the non-rotatable frictional members, a chamber, a cylinder for each radially movable wedge member and a piston in each cylinder and in position to move the corresponding wedge member.

In testimony whereof I hereunto affix my signature.

ERNEST D. BROWN.